United States Patent [19]
Machule et al.

[11] Patent Number: 5,187,340
[45] Date of Patent: Feb. 16, 1993

[54] METHOD FOR WELDING AT LEAST ONE REGION OF AN OVERLAY SHEET TO A RECEIVING SURFACE OF A CARRIER LAYER

[75] Inventors: Lothar Machule, Weissbach; Hans R. Obermeier, Saaldorf, both of Fed. Rep. of Germany

[73] Assignees: Konrad Hornschuch AG; HFT-Obermeier Maschinenbau GmbH, both of Fed. Rep. of Germany

[21] Appl. No.: 706,784

[22] Filed: May 29, 1991

[30] Foreign Application Priority Data

May 31, 1990 [DE] Fed. Rep. of Germany ....... 4017577

[51] Int. Cl.$^5$ ............................................. B23K 13/02
[52] U.S. Cl. ............................. 219/10.53; 219/10.63; 219/10.81; 219/78.01; 219/78.02; 156/380.2; 156/380.6; 156/272.2
[58] Field of Search ............... 219/10.53, 10.81, 78.02, 219/92, 67, 117.1, 10.63, 78.01; 156/73.5, 380.2, 380.4, 272.2, 274.4, 274.6, 274.8, 246, 283, 273.3, 380.6; 52/172; 521/107

[56] References Cited

U.S. PATENT DOCUMENTS

| | | | |
|---|---|---|---|
| 2,903,543 | 9/1959 | Rueggeberg | 219/10.53 |
| 3,897,593 | 7/1975 | Becker | 219/92 |
| 4,124,430 | 11/1978 | Peterson | 156/380 |
| 4,352,709 | 10/1982 | Urai et al. | 219/10.53 |
| 4,451,721 | 5/1984 | Nemeskeri | 219/10.53 |
| 4,452,943 | 6/1984 | Goldman | 219/10.53 |
| 4,829,152 | 5/1989 | Rostoker et al. | 219/78.02 |
| 4,950,347 | 8/1990 | Futagawa | 156/272.4 |

FOREIGN PATENT DOCUMENTS

| | | |
|---|---|---|
| 949374 | 3/1956 | Fed. Rep. of Germany. |
| 1915445 | 10/1970 | Fed. Rep. of Germany. |
| 2153815 | 11/1972 | Fed. Rep. of Germany. |
| 3420779 | 12/1984 | Fed. Rep. of Germany. |

OTHER PUBLICATIONS

Patent Abstracts of Japan, vol. 9, No. 111, May 1985 (Japanese Patent Application 59-232820—Yoshino published Dec. 1984).

Primary Examiner—Geoffrey S. Evans
Assistant Examiner—Tu Hoang
Attorney, Agent, or Firm—Frost & Jacobs

[57] ABSTRACT

A method for welding at least one region of an overlay sheet (16) to a receiving surface of a carrier layer (14) by means of high frequency energy. In the method, on the surface remote from the receiving surface of the carrier layer (14) a foil (12) of electrically conductive material is disposed. The overlay sheet (16) is placed at least on a part of the receiving surface of the carrier layer (14). A high frequency electrode (18, 20) is placed onto the overlay sheet (16) in the region to be welded to the carrier layer (14) and a ground electrode (22) is placed onto a region of the overlay sheet (16) not to be welded to the carrier layer (14) or onto a part of the receiving surface not covered by the overlay sheet (16), said ground electrode (22) having an area which is greater than that of the high frequency electrode (18, 20). The high frequency energy is then switched on while the high frequency electrode (18, 20) is held with pressure against the overlay sheet (16).

7 Claims, 2 Drawing Sheets

METHOD FOR WELDING AT LEAST ONE REGION OF AN OVERLAY SHEET TO A RECEIVING SURFACE OF A CARRIER LAYER

BACKGROUND OF THE INVENTION

In establishing weld connections between an overlay foil or sheet and a carrier layer by means of high frequency energy, problems are frequently encountered when materials with very different dielectric constants are involved and when in particular the carrier layer represents the top layer of a thick laminate itself made up of a plurality of layers. One of the problems is that it is not easily possible to concentrate the high frequency energy exactly at the depth of the laminate where the heating and thus the welding is to be achieved. If for example the laminate is a foamed body to which a textile web is adhered which is to be welded to an overlay sheet at specific points the high frequency energy must be concentrated as far as possible in the region of the overlay sheet to ensure that the weld connection does in fact arise only between the overlay sheet and the textile web. Such laminates, which are welded to overlay sheets, are frequently used in the automobile industry as door inner linings in which certain areas are covered with an overlay sheet in the form of a plastic layer while in other areas a textile web matching the seat covers of the corresponding vehicle is exposed. To obtain an attractive appearance a clean weld joint must be established between the overlay sheet and the textile web and must surround the exposed area of the textile web. In the bagmaking industry as well it is frequently desirable to weld laminates of very different materials to an overlay sheet and the aim is always a clean appearance of the weld joint made.

In the present context it should be pointed out that the term "welding" is also used in the relevant art when, with the aid of high frequency energy, plastic sheets are heated up to melting and are pressed into textile materials so that the joint made is not a weld joint in the true sense in which both materials are heated above the melting point but a joint in which only the one material melts, penetrates into the other material and adheres to the latter by form locking.

SUMMARY OF THE INVENTION

The objective of the invention is to provide a method of the type set forth above which makes it possible to produce clean weld joints between an overlay sheet and a carrier layer, even when the carrier layer consists of a laminate of a plurality of layers with different dielectric constants and thicknesses.

When using the method according to the invention the high frequency energy is always concentrated where the weld connection is actually to be made, independently of whether or not the carrier layer represents the uppermost layer of a laminate. The method according to the invention permits the formation of clean weld seams so that high-quality goods can be made which also completely satisfy high demands.

DESCRIPTION OF THE DRAWINGS

An example of embodiment of the invention will now be explained with the aid of the drawings, wherein.

DETAILED DESCRIPTION OF THE INVENTION

Figure 1:
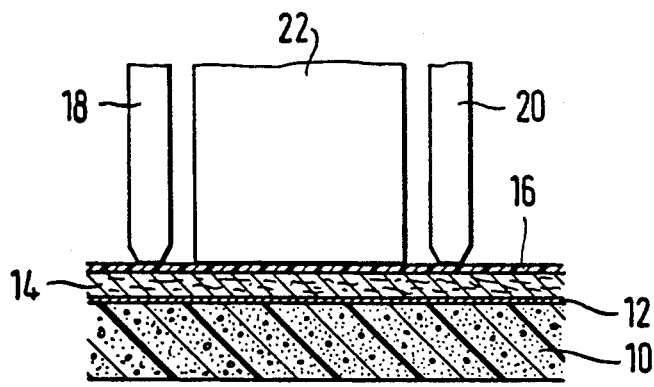
FIG. 1 shows a section of the materials to be welded, the high frequency electrodes and a ground electrode being placed on the overlay sheet.

In FIG. 1 a laminate is illustrated in section and consists of a base layer 10 of a polyurethane foam, a thin aluminium foil 12 and a carrier layer 14 of textile material. An overlay sheet 16 of plastic is placed on the laminate and is to be welded to specific regions of the carrier layer 14 by the high frequency welding technique. The laminate is held together by the aluminium foil 12 being stuck to the bas layer 10 and the carrier layer 14 in turn stuck to the aluminium foil.

FIG. 1 illustrates schematically two high frequency electrode 18, 20 and a ground electrode 22. The form of the electrodes depends on the particular use, i.e. on the points where the weld joint is to be established between the overlay sheet 16 and the carrier layer 14. In the example of FIG. 1 the weld joint is to be established in the region of the lower ends of the high frequency electrodes 18, 20. These electrodes 18, 20 may also be a single electrode surrounding the ground electrode 22 in spaced relationship. The ground electrode 22 may for example be circular, rectangular, oval or the like. As can be seen from FIG. 1, the ground electrode 22 has a substantially larger contact area with the overlay sheet 16 than the high frequency electrodes 18, 20. The reason for this will be apparent in more detail from the subsequent description.

Figure 2:
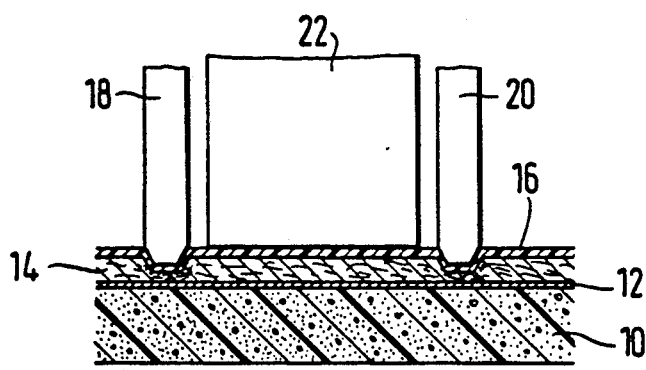
FIG. 2 shows a similar section to FIG. 1 after the high frequency energy has been switched on and the high frequency electrodes pressed onto the overlay sheet.

In FIG. 2 the stage of the welding method is illustrated which is reached after application of the high frequency energy to the high frequency electrodes 18, 20 and after pressing said electrodes into the overlay sheet 16. After the HF energy has been switched on a high frequency field of relatively high energy density forms between the lower ends of the high frequency electrodes 18, 20 and the aluminium foil 12. The aluminium foil 12 acts here as an auxiliary ground, this being due to the fact that the ground electrode 22 bears on the overlay sheet 16 with a relatively large area compared with the area of the high frequency electrodes 18, 20. It has been found in practical tests that the area of the ground electrode 22 should be about 3 to 5 times greater than the contact area between the high frequency electrodes 18, 20 and the overlay sheet 16. It is only when this area relationship is observed that an energy density is achieved beneath the high frequency electrodes 18, 20 which is high enough to generate the heat necessary for melting the overlay sheet 16. By pressure exerted on the high frequency electrodes 18, 20 the molten material of the overlay sheet 16 is pressed into the textile material of the carrier layer 14 so that after cooling of the overlay sheet 16 a form-locking connection has been achieved with the carrier layer 14 in the regions in which the material of the overlay sheet 16 has penetrated into the textile material of the carrier layer 14.

Figure 3:
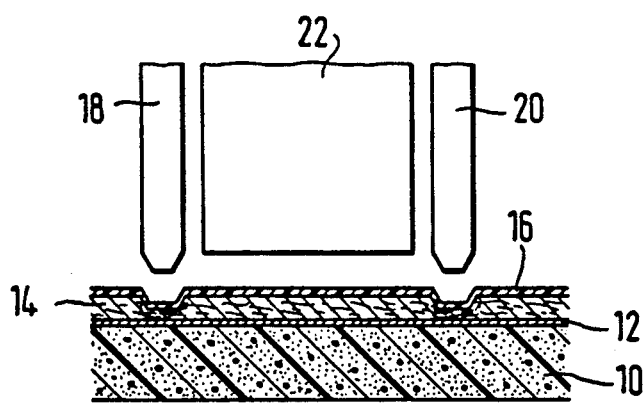
FIG. 3 shows the same section as FIG. 2 after the high frequency electrodes and the ground electrode have been lifted off the overlay sheet

In FIG. 3 the result of the welding method is shown after lifting off the high frequency electrodes 18, 20 and the ground electrode 22.

Figure 4:
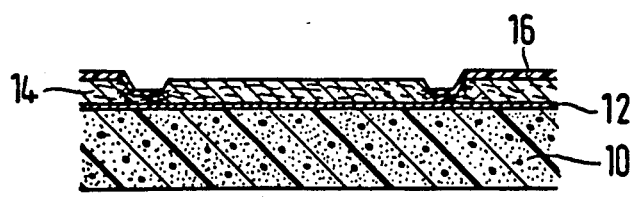
FIG. 4 is a section through the result of the method according to the invention after the part of the overlay sheet bordered by the weld lines has been removed so that the carrier layer therebelow is exposed.

The overlay sheet 16 may now be removed in the region between the welds in accordance with FIG. 4 so that the textile material of the carrier layer 14 is exposed in said regions. In the manner outlined a socalled textile mirror is produced as frequently employed in the door inner linings of motor vehicles. In areas in which it is subject to hard use, that is for example in the immediate vicinity of the door grips, the inner lining can therefore be covered with the overlay sheet, while in other areas, where it is subject to less wear, it has a pleasant appearance possibly adapted to the seat covers because the textile material of the carrier layer 14 is exposed.

Figure 5:
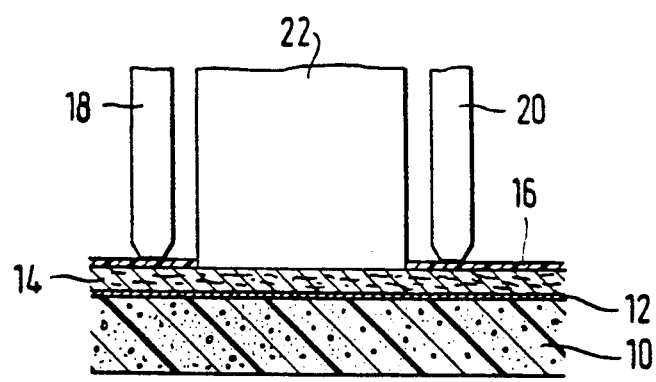
FIG. 5 is a section of the materials to be welded, the high frequency electrodes being placed on an overlay sheet and a ground electrode being placed on a part of the receiving surface of a carrier layer not covered by the overlay sheet.

FIG. 5 shows an embodiment wherein ground electrode 22 is placed on a part of carrier layer 14 (receiving surface) which is not covered by overlay sheet 16.

By appropriate shaping of the lower end sides of the high frequency electrodes 18, 20 it is possible to impart to the plastic material of the overlay sheet 16 in the weld regions a specific appearance, for example the appearance of an ornamental seam. This can give the impression of the overlay sheet 16 having been sewn on to the carrier layer 14. When using the method described to make cases, handbags and the like, the possibility of giving the weld joints produced a desired structure is of particular advantage.

In the method described, by applying the aluminium foil 12 to the back of the carrier layer 14 it is possible to make clean weld joints irrespective of the thickness of the laminate to which the overlay sheet 16 is to be welded.

It is pointed out that instead of the textile material used as carrier layer in the example of embodiment described, other materials can also be employed, for example, plastic materials. It is also readily possible to use another material instead of the aforementioned polyurethane foam as base layer, for example pressboard, tarboard, wood or the like.

We claim:

1. A method for welding at least one region of an overlay sheet to a receiving surface of a carrier layer by means of high frequency energy, characterized by the steps of providing a carrier layer having a receiving surface and an opposite surface, and a layer of aluminum foil applied to the opposite surface of said carrier layer, placing an overlay sheet on at least a part of the receiving surface of said carrier layer, placing a high frequency electrode on and in contact with the overlay sheet in a region to be welded to the carrier layer, placing a ground electrode on a region of the overlay sheet which is not to be welded, or on a part of the receiving surface not covered by said overlay sheet, said ground electrode having a contact area greater than a contact area of the high frequency electrode, and applying high frequency energy to said high frequency electrode while holding said high frequency electrode under pressure against said overlay sheet.

2. A method according to claim 1 wherein said carrier layer is made of a textile material.

3. A method according to claim 1 wherein said carrier layer is made of a plastic material.

4. A method according to claim 1 wherein the layer of aluminum foil is applied to a thick base layer, and wherein the carrier layer overlies said aluminum foil layer on a side thereof remote from the base layer.

5. A method according to claim 4 wherein the base layer is a polyurethane foam.

6. A method according to claim 4 wherein said carrier layer is made of a textile material.

7. A method according to claim 4 wherein said carrier layer is made of a plastic material.

* * * * *